United States Patent
Santhana Krishnan et al.

(10) Patent No.: US 12,328,573 B2
(45) Date of Patent: Jun. 10, 2025

(54) SALTED KEY REFRESHMENT IN WIRELESS BATTERY MANAGEMENT SYSTEMS

(71) Applicant: TEXAS INSTRUMENTS INCORPORATED, Dallas, TX (US)

(72) Inventors: Archanaa Santhana Krishnan, Blacksburg, VA (US); Alexis Justine Burnight, Dallas, TX (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 521 days.

(21) Appl. No.: 17/461,887

(22) Filed: Aug. 30, 2021

(65) Prior Publication Data

US 2023/0065059 A1  Mar. 2, 2023

(51) Int. Cl.
*H04W 12/041* (2021.01)
*B60L 53/66* (2019.01)
*H04L 5/00* (2006.01)

(52) U.S. Cl.
CPC ........... *H04W 12/041* (2021.01); *B60L 53/66* (2019.02); *H04L 5/0055* (2013.01)

(58) Field of Classification Search
CPC ........... H04W 12/041; H04W 12/0433; H04W 12/50; B60L 53/66; B60L 58/10; H04L 5/0055; H04L 2463/062; H04L 5/0094; H04L 5/001
See application file for complete search history.

(56) References Cited

U.S. PATENT DOCUMENTS 5,764,766 A * 6/1998 Spratte .................. H04L 9/0838
380/283
2020/0267547 A1 * 8/2020 Tal .......................... H04B 1/713

FOREIGN PATENT DOCUMENTS

CN  112507365 A * 3/2021 ......... G06F 16/2255

OTHER PUBLICATIONS

Ariton Xhafa, "Medium Access Control (MAC) for Wireless Battery Management Systems (WBMS)," May 5, 2019, 61 p.
Krawczyk et al., "HMAC: Keyed-Hashing for Message Authentication," Feb. 1997, 11 p.
Krishnan et al., "Optimal Authenticated Node Joining and Key Exchange for Wireless Battery Management Systems," Jun. 24, 2019, 4 p.
Krishnan et al., "Key Refreshment During Unicast and Broadcast Communications in Wireless Battery Management Systems," Jun. 27, 2019, 7 p.

* cited by examiner

*Primary Examiner* — Mohammed Waliullah
(74) *Attorney, Agent, or Firm* — Carl G. Peterson; Frank D. Cimino

(57) ABSTRACT

A method for key refreshment in a wireless network system using a salt. The method includes receiving, from each of a plurality of secondary nodes communicably coupled to a primary node, a current session number. The current session numbers are compared to a session number at the primary node to identify a mismatch, and a salt is generated responsive to identifying the mismatch. The method further includes sending the salt to each of the plurality of secondary nodes having a current session number matching the session number at the primary node.

21 Claims, 10 Drawing Sheets

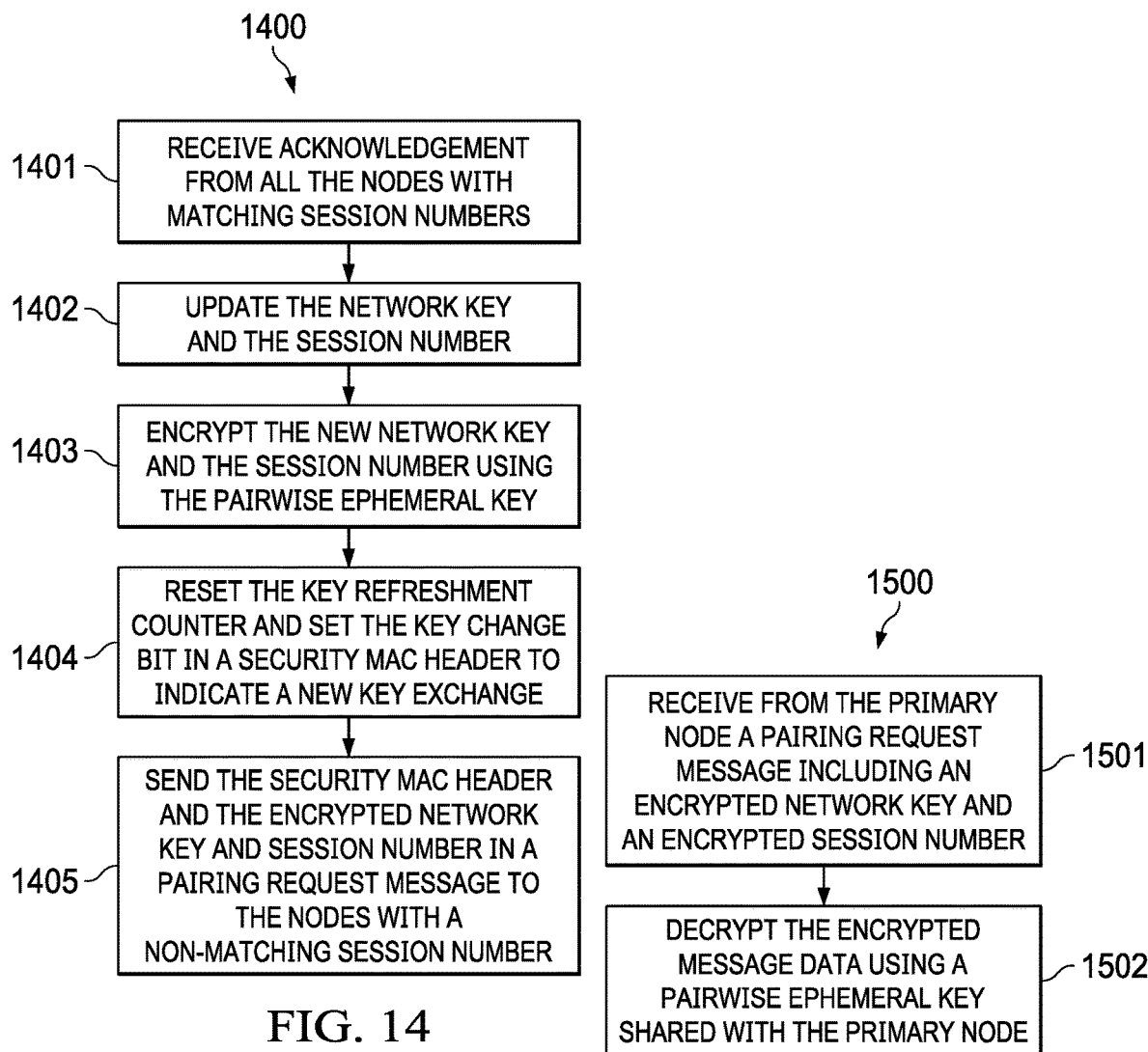

SALTED KEY REFRESHMENT IN WIRELESS BATTERY MANAGEMENT SYSTEMS

BACKGROUND

In a wireless network system, a primary node can communicate using a wireless communications protocol with a plurality of secondary nodes to control and monitor their communications. The wireless communications must be secure from threats external to the network, such as malicious nodes or entities attempting to intercept the wireless communications data or to inject malicious data into the network. Some of the threats can be prevented be encrypting the communicated data. Data encryption involves using a form of an encryption key which can be shared by network nodes and used to decrypt the received data. The key is kept secret and only shared by the primary node with an authorized secondary node. The secondary node uses this shared key with a suitable decryption function to decrypt the received encrypted data. An unauthorized node or malicious entity would not have access to the network key and therefore is unable to decrypt any intercepted data or send properly encrypted data to the network nodes.

SUMMARY

In accordance with at least one example of the disclosure, a method comprises receiving, from each of a plurality of secondary nodes communicably coupled to a primary node, a current session number; comparing the current session numbers to a session number at the primary node to identify a mismatch; generating a salt for key derivation responsive to the mismatch; and sending the salt to each of the plurality of secondary nodes having a current session number matching the session number at the primary node.

In accordance with another example of the disclosure, a method comprises sending to a primary node a current session number at a secondary node communicably coupled to the primary node; receiving from the primary node a salt for key derivation; and generating a new network key using a key derivation function with the salt, a current network key and the current session number at the secondary node.

In accordance with another example of the disclosure, an apparatus comprises a plurality of secondary nodes each comprising a secondary processor configured to generate a new network key using a key derivation function with a salt, a current network key, and a current session number; and a primary node configured to connect to the plurality of secondary nodes using a wireless connection and comprising a primary processor, the primary processor configured to generate and send the salt for key derivation to at least one secondary node from the plurality of secondary nodes responsive to a mismatch between a current session number at another node of the plurality of secondary nodes and a session number at the primary node.

BRIEF DESCRIPTION OF THE DRAWINGS

For a detailed description of various examples, reference will now be made to the accompanying drawings in which:

FIG. 14 is a flow diagram of a post acknowledgement paring state process by a primary node in a wireless network system, in accordance with various examples.

FIG. 15 is a flow diagram of a paring state process by a secondary node with a non-matching session number in a wireless network system, in accordance with various examples.

DETAILED DESCRIPTION

Figure 1:
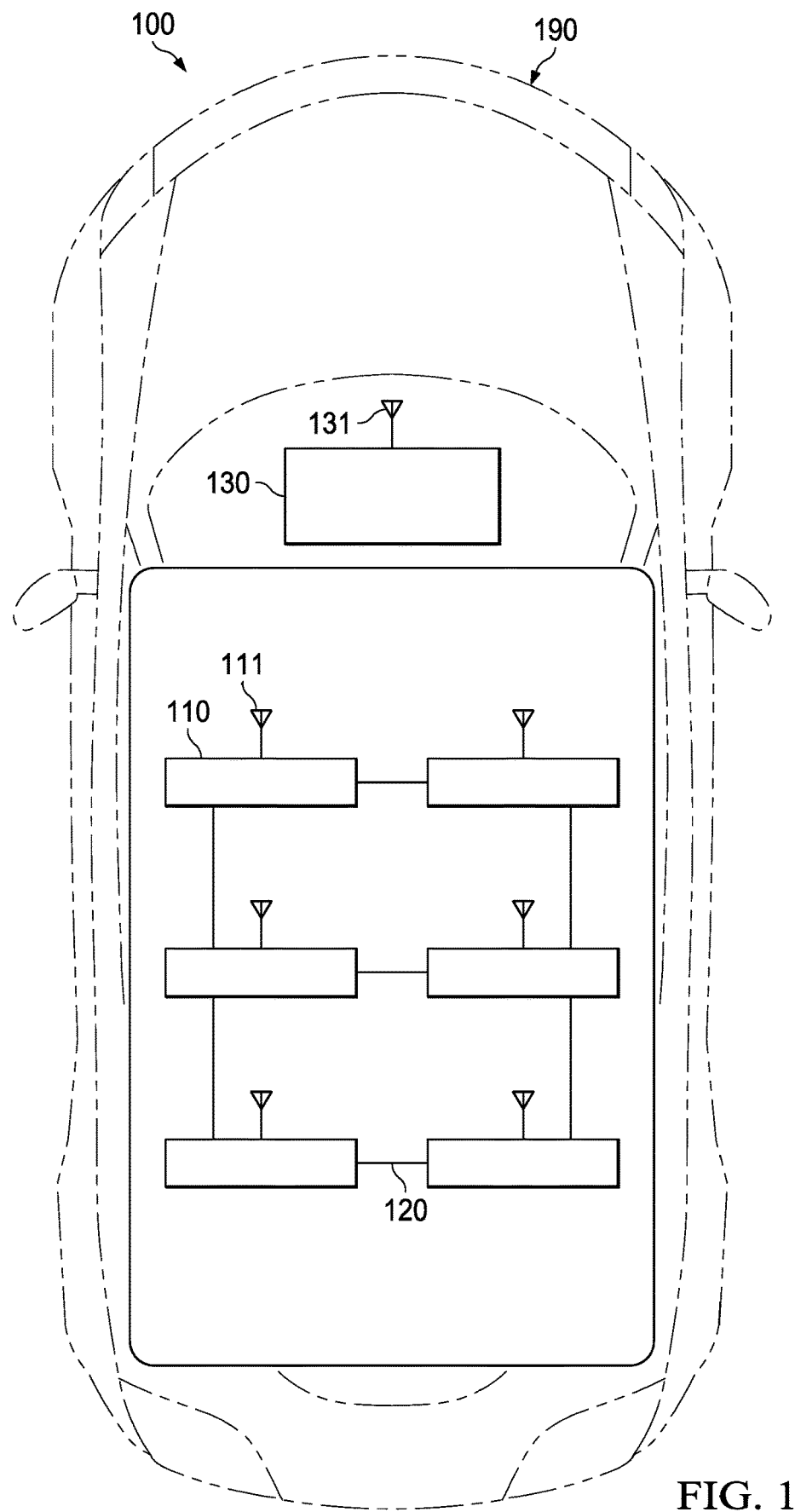
FIG. 1 is a schematic diagram of an automotive vehicle comprising a wireless battery management systems (WBMS), in accordance with various examples.

To secure the communications of a wireless network using a network key, the key needs to be refreshed, i.e., updated, frequently, for example at the start of each session. The key refreshment process is to ensure the security of communications of current and future data even if a previously used network key was compromised, for instance obtained by an unauthorized entity. This is referred to herein as forward secrecy. Refreshing the key also ensures that new nodes joining the wireless network cannot gain access to secured information from past sessions using previous network keys. This is referred to as backward secrecy. To refresh the network key, the network nodes compute a new network key for each new session using current network information and a key derivation function (KDF). The current network information includes the current network key that was previously computed and a current network session number authenticated with the primary node. A session number is associated with each network key to keep track of the version of the network key. The session number is incremented after computing the new network key.

In addition to the start of each session, the key may be refreshed when a node leaves the network to ensure forward secrecy, and when a node joins the network to ensure backward secrecy. However, a situation may arise where a node that has left the network contains all the information needed to compute the new network key, which is also computed by the nodes remaining in the network. Hence, if the leaving node is compromised and this information is obtained by an unauthorized entity, the new network key can also be computed by the unauthorized entity and forward secrecy in the network could be breached. Further measures are thus needed to avoid such situation.

This disclosure describes various examples of an improved key refreshment process that further increases wireless network security, including forward secrecy, by ensuring that the current network information does not enable unauthorized entities to determine the refreshed network key. This is achieved by introducing a new information component for the key refreshment process. The new component provides additional information necessary to refresh the network key that is not available to nodes that leave the network. Specifically, in addition to the current network key and the session number, a salt value (also referred to simply as "salt") may be used as an additional input to the KDF at the nodes to compute the new network key. The salt is encrypted so that it is made unavailable to nodes that have left the network or malicious nodes, and is only made available to the current nodes in the network.

The primary node generates and encrypts the salt, which is then shared only with the nodes that remain in the network before the key refreshment process. The primary node has knowledge of any nodes that may have left the network and initiates a key refreshment process using the salt with the secondary nodes remaining in the network. The salt is encrypted and shared with each secondary node in the network using a corresponding key, referred to as a pairwise ephemeral key, which is individually unique to that secondary node. This ensures that only the secondary node intended to receive the encrypted salt is able to decrypt the salt value and then use it in the key refreshment process. Accordingly, the new network key is computed using additional information to the current network parameters available to previous nodes, which may have left the network or have been compromised.

In examples described in the disclosure, the key refreshment process may be implemented in a wireless battery management network system (WBMS) using the salt in conjunction with the WBMS protocol and any other security settings. The WBMS may comprise an electronic control unit and one or more battery modules configured to communicate using a wireless connection with the electronic control unit. For instance, the WBMS may be a component of an electric vehicle, e.g., an electric car charged by one or more packs of battery cells. In the WBMS architecture, the electronic control unit serves as the primary node that performs key generation and key refreshment, and the battery modules serve as the secondary nodes that perform key refreshment using the salt according to suitable network conditions, as described further below. The remainder of this description assumes any wireless network system or application including a WBMS.

FIG. 1 is a schematic diagram of an automotive vehicle comprising a wireless battery management systems (WBMS), in accordance with various examples. Specifically, FIG. 1 illustrates an automotive vehicle 100 comprising an electronic control unit (ECU) 130 and one or more battery modules 110. The automotive vehicle 100, also referred to as an electric vehicle (EV), may be any automotive vehicle that includes an electric engine powered by battery cells, or that includes other electric systems powered by battery cells.

The ECU 130 may comprise an embedded electronic system or circuitry that controls one or more of the electric systems or subsystems in the automotive vehicle 100, such as power, air conditioning, heating, radio, and electromechanical systems. The battery modules 110 include one or more battery units coupled to each other by way of a controller area network (CAN) bus 120 or other networking and/or bus structure. The battery unit may include a battery pack comprising a plurality of stacked battery cells. A battery cell is an electrochemical cell capable of generating electrical energy from chemical reactions. For example, the electrochemical cells may be voltaic cells or galvanic cells that generate an electric current. The battery cells may be connected in parallel, in series, or in a series-and-parallel configuration to deliver a target voltage, capacity, or power density. The CAN bus 120 may be configured according to a bus standard that enables microcontrollers and devices to communicate with each other and that is able to handle the voltage, current, and power used by such systems.

The battery modules 110 may also include a battery management unit. The battery management unit may be any electronic system or circuitry that manages the operation and charging of rechargeable battery units, and protects such battery units from operating outside target operating parameters. For instance, the battery management unit may comprise an embedded controller system that manages and controls battery unit voltage, current, and temperature levels for safe and proper operation. The battery management unit may monitor the state of the battery unit, calculate battery output related data, and provide such data to the ECU 130.

The ECU 130 is configured to communicate with the battery modules 110 using any suitable means of wireless communication protocols, for example using Bluetooth, Wi-Fi, wireless access network (WAN), near field communication (NFC), or other wireless communications technology. The battery modules 110 may each comprise a controller for processing communications data, a wireless communications interface and an antenna 111 capable of exchanging wireless communications signals with the ECU 130. Similarly, the ECU 130 may comprise a wireless interface and an antenna 131. The WBMS system is formed by the ECU 130, which serves as a primary node, and the one or more battery modules 10, which operate as secondary nodes for which communications are managed by the primary node.

The wireless network systems described herein may also find application beyond automotive vehicles. Other applications in which the WBMS described herein may be useful include wireless networking (e.g., cell phone networks, wireless local area networks (WLANs), wireless sensor networks, satellite communication networks, terrestrial microwave networks), personal electronics (e.g., smartphones, laptop computers, desktop computers, tablets, notebooks, artificial intelligence assistants), appliances (e.g., refrigerators, microwave ovens, toaster ovens, dishwashers), avionics (e.g., aircraft, satellites, spacecraft), and numerous other electronic systems that involve wireless communications.

Figure 2:
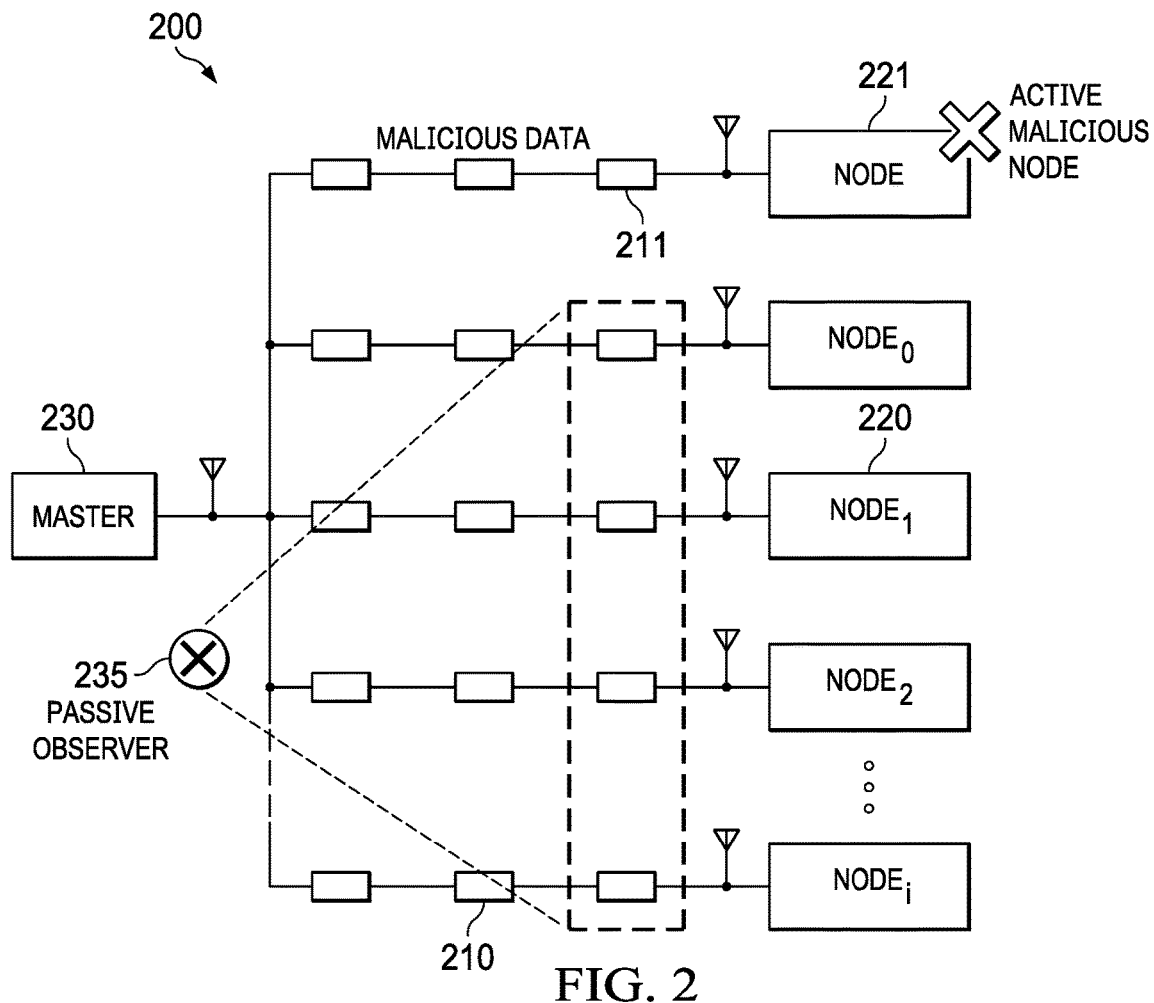
FIG. 2 is a schematic diagram of a compromised communications scenario in a wireless network system, in accordance with various examples.

FIG. 2 is a schematic diagram of a schematic diagram of a communications scenario in a wireless network system 200 such as a WBMS, in accordance with various examples. For instance, the WBMS may comprise an EV ECU serving as a primary node and a plurality of battery modules serving as secondary nodes. Specifically, FIG. 2 illustrates a wireless network system 200 comprising a primary node 230 that exchanges data packets 211, using a wireless connection, with each of a plurality of secondary nodes 220. The data security of the wireless network system 200 may be compromised, for example, by an unauthorized passive observer 235 who listens to the wireless communications and thus may obtain the secured data or by an unauthorized entity 221 that establishes a connection with the primary node 230 or a secondary node 220.

The passive observer 235 may be any device with wireless communications capability in close proximity to the nodes and therefore capable of receiving wireless signals carrying data packets 210 from the WBMS 200. The passive observer 235 may not be able to decrypt the received data without access to the proper network key used for the data encryption. The unauthorized entity 221 may be a node that was previously connected to the system and is no longer authorized to receive and send data, or a node that is connected to the system for malicious intent, for example to receive secured data or inject malicious data packets 211 into the system. In the case of an EV WBMS, the unauthorized entity 221 may be an unauthorized battery module or device that is added to the system or an existing battery module which has been hacked by an external source. In both situations, data security is compromised when the unauthorized entity 221 has obtained a network key from a previous session and may therefore be able to refresh the key and access the encrypted data.

Figure 3:
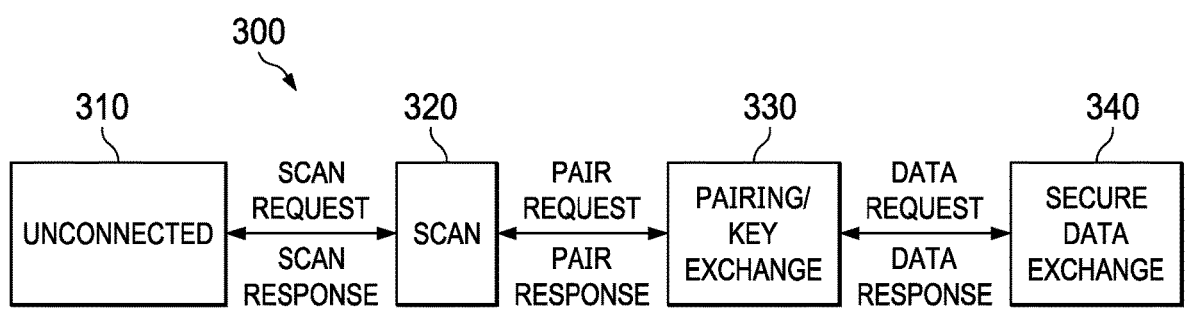
FIG. 3 is a schematic diagram of a plurality of communication states for a secure connection in a wireless network system, in accordance with various examples.

FIG. 3 is a schematic diagram of a plurality of communication states 300 for establishing a secure connection in a wireless network system, such as a WBMS 200, in accordance with various examples. Specifically, the network nodes, including the primary node and each secondary node, undergo a sequence of communications states 300 starting from an unconnected state 310, followed by a scanning state 320 and a pairing state 330, and reaching a secure data exchanges state 340. The primary node and the secondary node transition through the communications states 300 to exchange key encryption information and establish a secure wireless connection accordingly.

Before establishing a connection, the primary node at the unconnected state 310 may send a scan request message to the secondary node to authenticate the node as an authorized node connected to the network before exchanging secure data at a new connection session. The scan request message may include a session number indicating the current session number at the primary node. The request initiates a scanning and pairing process between the two nodes. At the scanning state 320, the secondary node may determine whether the session number from the primary node matches with a current session number at the secondary node. If a match is found, the secondary node may send a response to the primary node to indicate that the session number between the two nodes is a match and hence start the pairing state 330.

At the pairing 330, the primary node sends a pairing request to the secondary node to exchange key information allowing data encryption and decryption over a secure connection. Upon successfully obtaining this information, the secondary node may return a pairing response as an acknowledgment to the primary node. In the case of establishing a first session by the primary node, for instance with a new secondary node to the network, the two nodes may perform a full key exchange where the primary node sends an encrypted network key and an encrypted session number to the new secondary node. In subsequent sessions, the primary node and the secondary node may perform a key refreshment process to ensure a new network key is generated. Upon obtaining the proper network key for the current session, the secondary node begins exchanging data requests and data responses, for example in the form of session data packets, with the primary node at the secure data exchange state 340.

Figure 4:
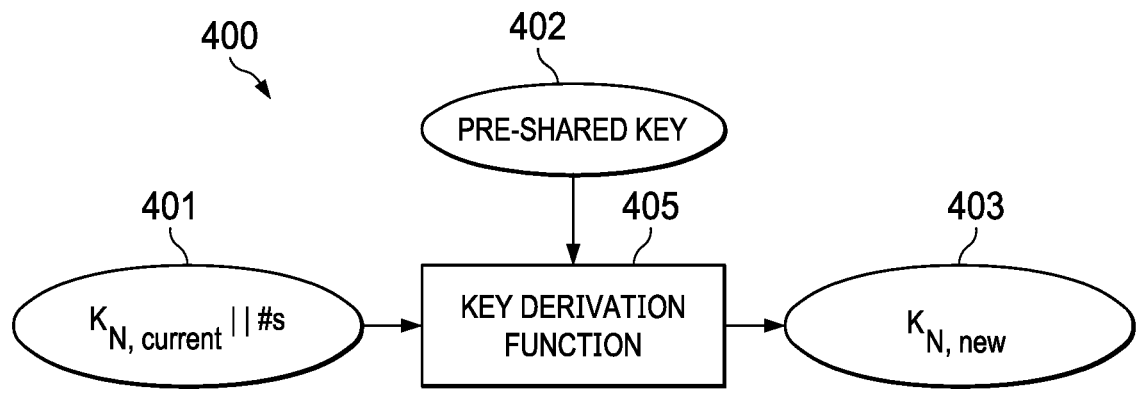
FIG. 4 is a schematic diagram of a key derivation process at a wireless communications node, in accordance with various examples.

FIG. 4 is a schematic diagram of a key derivation process 400 at a wireless communications node, in accordance with various examples. Specifically, the key derivation process 400 may be performed by a secondary node during the scanning and pairing states in order to establish a secure connection with the primary node. The key derivation process 400 may be used to generate a new network key 403 ($K_{N,\ new}$) at a new session N. This is accomplished by using as input 401 to a KDF 405 the current network key ($K_{N,\ current}$) and the current session number (#s), which has been matched with the session number at the primary node. The current network key ($K_{N,\ current}$) may be concatenated with the session number (#s) as input 401 to the KDF 405. The KDF 405 may be previously known to the secondary node. The secondary node may also use a pre-shared key 402 as another input to secure the use of the KDF. The pre-shared key 402 may be added to the secondary node during a manufacturing or installment/setup phase. As described above, this key derivation process may be used by an unauthorized entity, such as a node that was previously connected but had left the network and has knowledge of the KDF input information.

Figure 5:
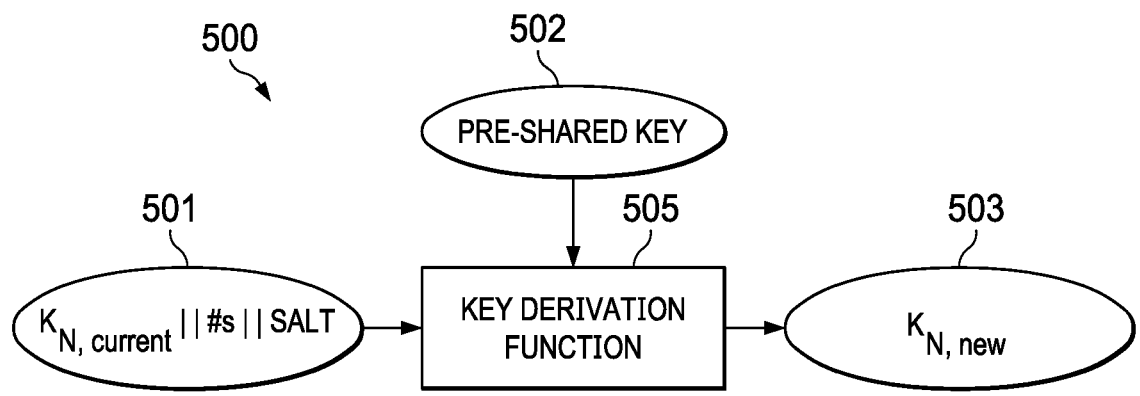
FIG. 5 is a schematic diagram of a key derivation process using a salt for a network key at a wireless communications node, in accordance with various examples.

FIG. 5 is a schematic diagram of a key derivation process 500 using a salt to obtain a new network key, in accordance with various examples. Specifically, the key derivation process 500 overcomes the shortcoming of the key derivation process 400 by preventing an unauthorized entity with possession of the KDF input information from previous sessions to obtain the new network 503 key ($K_{N,\ new}$). This is achieved by adding, for each session, a salt to the current network key ($K_{N,\ current}$) and the current session number (#s) as input 501 to the KDF 505. The salt may be secured between the primary node and each secondary node that is authenticated by the primary node. The salt is encrypted uniquely for each authorized secondary node using a pairwise ephemeral key only known to that secondary node. A pre-shared key 502 may also be used as another input to secure the use of the KDF 505.

Figure 6:
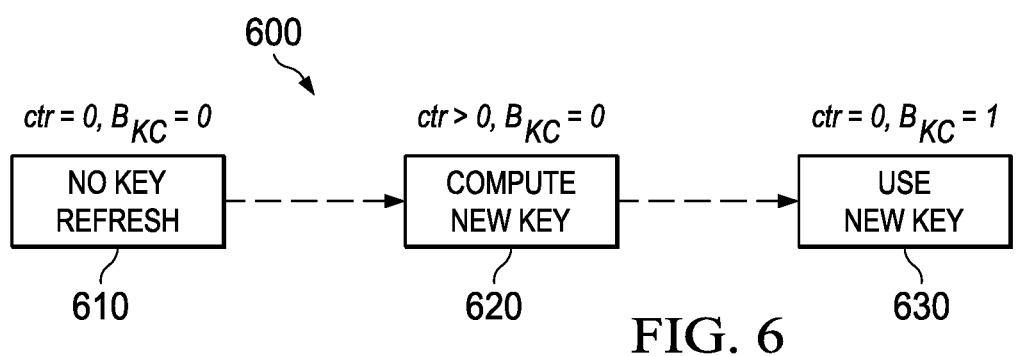
FIG. 6 is a schematic diagram of a plurality of frame header signals for managing key refreshment in a wireless network system, in accordance with various examples.

FIG. 6 is a schematic diagram of a plurality of frame header signals 600 for managing key refreshment in a wireless network system, in accordance with various examples. Specifically, the frame header signals 600 may be used by the primary node to indicate to the secondary nodes whether a key refreshment is needed and when to compute and use the new network key. The frame header signals 600 include a first media access control (MAC) header value 610 which is sent to the secondary node to indicate that no key refreshment is needed, a second MAC header value 620 which indicates to the secondary node when a new network key should be computed, and a third MAC header value 630 which indicates when to start using the new network key.

For this purpose, the primary node may set a plurality of fields in a security section of a MAC header of a data packet or frame sent to the secondary node. An example of the security section of the MAC header is shown in Table 1. The security section of the MAC header may comprise a frame counter which may be comprised of 32 bits, a key refreshment counter which may be comprised of 4 bits, a key change bit which may be comprised of 4 bits, and possibly additional reserved bits. In other examples, the security section fields in the MAC header, which are used for managing and signaling the key refreshment, may have different formats and sizes.

TABLE 1

| Octets:0-4 | | 1 | |
|---|---|---|---|
| Bits:0-31 | 0-3 | 4 | 5-7 |
| Frame counter | Key refreshment counter | Key change bit | Reserved |

The frame counter may be set by the nodes to identify and keep track of the frames sent between the primary node and the secondary nodes. The frame counter may also be used by the nodes to construct a nonce used for cryptographic operations. When the nodes start using a new network key, the counter frame may be set to zero to ensure that the same nonce-key pair is not reused at different sessions. The key refreshment counter may be used by the primary node to indicate to the secondary node when to start key refreshment. The value of the counter indicates the number of frames to be received by the secondary node before starting the key refreshment process. In this manner, the counter is used as a countdown value until key refreshment is started. For example, the key refreshment counter (ctr) may be set to zero in the first MAC header value 610 which indicates no key refreshment is needed. In the second MAC header value 620, the key refreshment counter may be set to a value indicating the remaining number of frames to be set before starting key refreshment and generating a new network key. The key refreshment counter may be reset in the third frame MAC header value 630 when the new network key is ready for use.

The key change bit may be set by the primary node, to a predefined value, to indicate the start of using the new network key. When the secondary node receives a key change bit that is set to the predefined value, the secondary node may update the current network key with a new network key, and increment the current session number for the start of a new session. For example, the key change bit ($B_{KC}$) may be set to zero in the first MAC header value 610 and the second MAC header value 620. The key change bit ($B_{KC}$) may then be set to one in the third MAC header value 630 to signal the secondary node to begin using the new network key.

Figure 7:
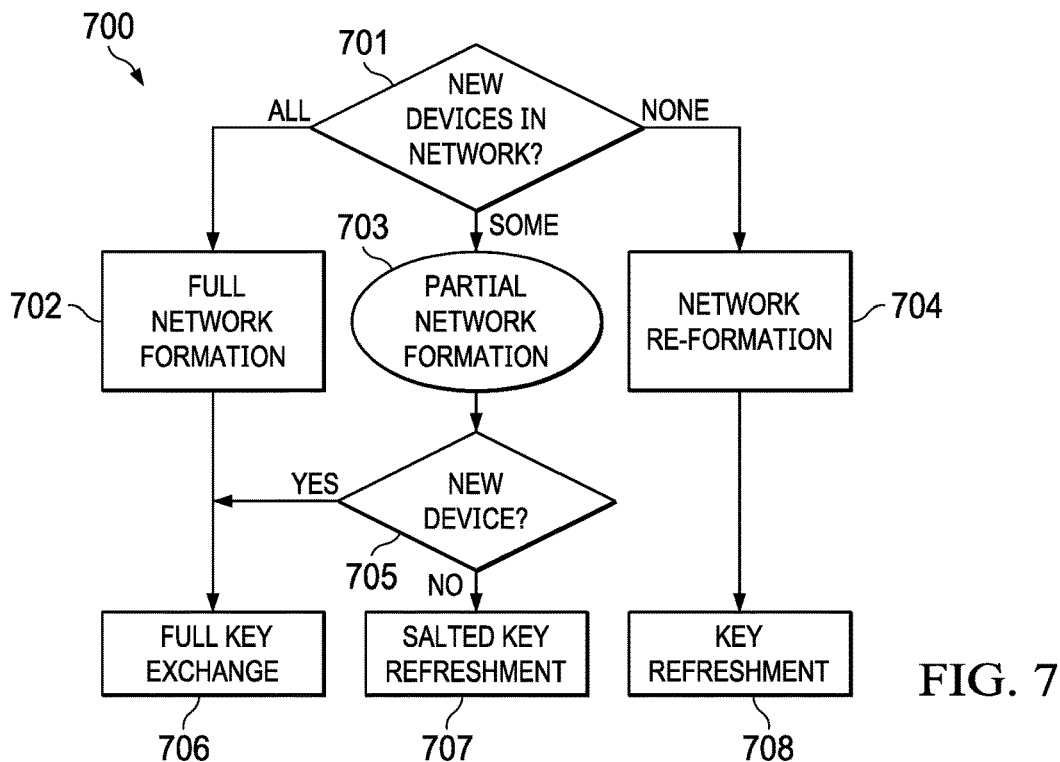
FIG. 7 is a flow diagram of a key exchange and key refreshment process between a plurality of nodes in a wireless network system, in accordance with various examples.

FIG. 7 is a flow diagram of a key exchange and key refreshment process 700 between a plurality of nodes in a wireless network system, in accordance with various examples. The key exchange and key refreshment process 700 may be performed by a primary node and one or more secondary nodes, for example in a WBMS. At decision step 701, the primary node may determine whether any new devices have joined the network. Specifically, the primary node may determine whether a secondary node is a new node to the network or a connected node that had previously established a connection with the network based on matching the session number between the primary node and the secondary node. This step can be performed during the scanning state between the primary node and each secondary node, as described above. If the session number is matched with the secondary node, the secondary node is considered a connected node. In the case of a mismatch or an invalid response from the secondary node, the primary node determines that the node has not established or maintained a previous connection.

In the case of detecting at least one new node with a mismatch in the session number, the primary node may perform partial network formation at step 703. In this case, the primary node may start key refreshment at the connected nodes and perform full key exchange at the new nodes. During partial network formation, the primary node may determine at decision step 705 whether each node is connected or new. If the node is a new device, the primary node starts a full key exchange process at step 706. In this case, the primary node may exchange new key information, including an encrypted network key and an encrypted session number with the new node. Alternatively, if the node is a connected node, the primary node may initiate the key refreshment process at step 707, which may include sending a salt for key derivation. The steps for partial network formation may be performed during the pairing state 330 described above.

In the case of determining that there are no new nodes in the network, the primary node may perform network reformation at step 704. During network reformation, the primary node may start, in step 708, the key refreshment process at the connected nodes without using a salt for key derivation. The steps for network reformation may be performed during the secure data exchange state 340 described above. Alternatively, if there are only new nodes in the network and no existing connected nodes, the primary node may perform a full network formation at step 702. During full network formation, the primary node may start the full key exchange in step 706 for all the nodes. The steps for full network formation may be performed during the pairing state 330.

Figure 8:
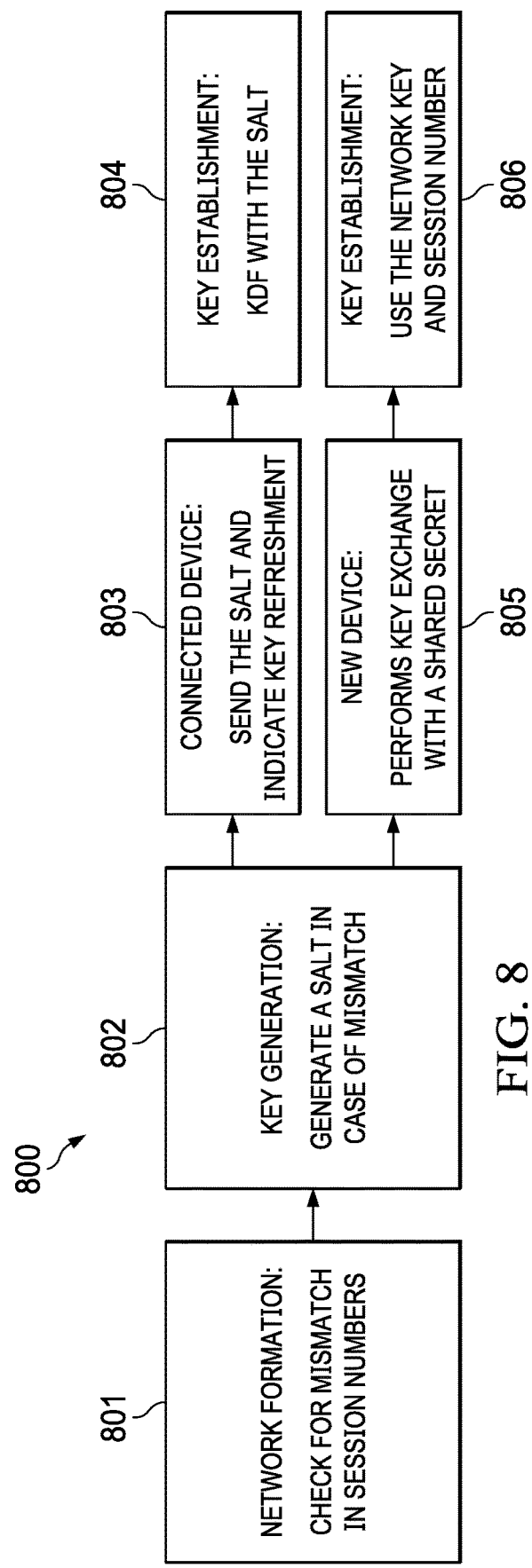
FIG. 8 is a flow diagram of another key refreshment and exchange process between a primary node and secondary nodes in a wireless network system, in accordance with various examples.

FIG. 8 is a flow diagram of another key refreshment and exchange process 800 between a primary node and secondary nodes in a wireless network system, in accordance with various examples. The key refreshment and exchange process 800 may be performed by a primary node and one or more secondary nodes, for example in a WBMS. Initially, during the network formation step 801, the primary node may check for a mismatch in the session number with any of the secondary nodes. This step may be performed in the scanning state 320 between the primary node and each secondary node, as described above. In the case of a key session mismatch with at least one of the secondary nodes, the primary node may proceed to the key generation step 802, where a salt is generated. At step 803, the primary node may send the generated salt and indicate a key refreshment to each connected device from the secondary nodes, for example using frame MAC header signaling. At step 804, the secondary node establishes a new network key using the KDF with the salt, for example according to the key derivation process 500. At step 805, the primary node may perform a key exchange with a shared secret with each new device from the secondary nodes. This step may include sending an encrypted network key and an encrypted session number to the new node. The network secret may be a pairwise ephemeral key unique to each node and previously derived using a public key exchange in the scanning state 320. At step 806, the secondary node establishes a new network key using the network key and the session number from the primary node. The key refreshment and key exchange steps above may be performed in the pairing state 330.

Figure 9:
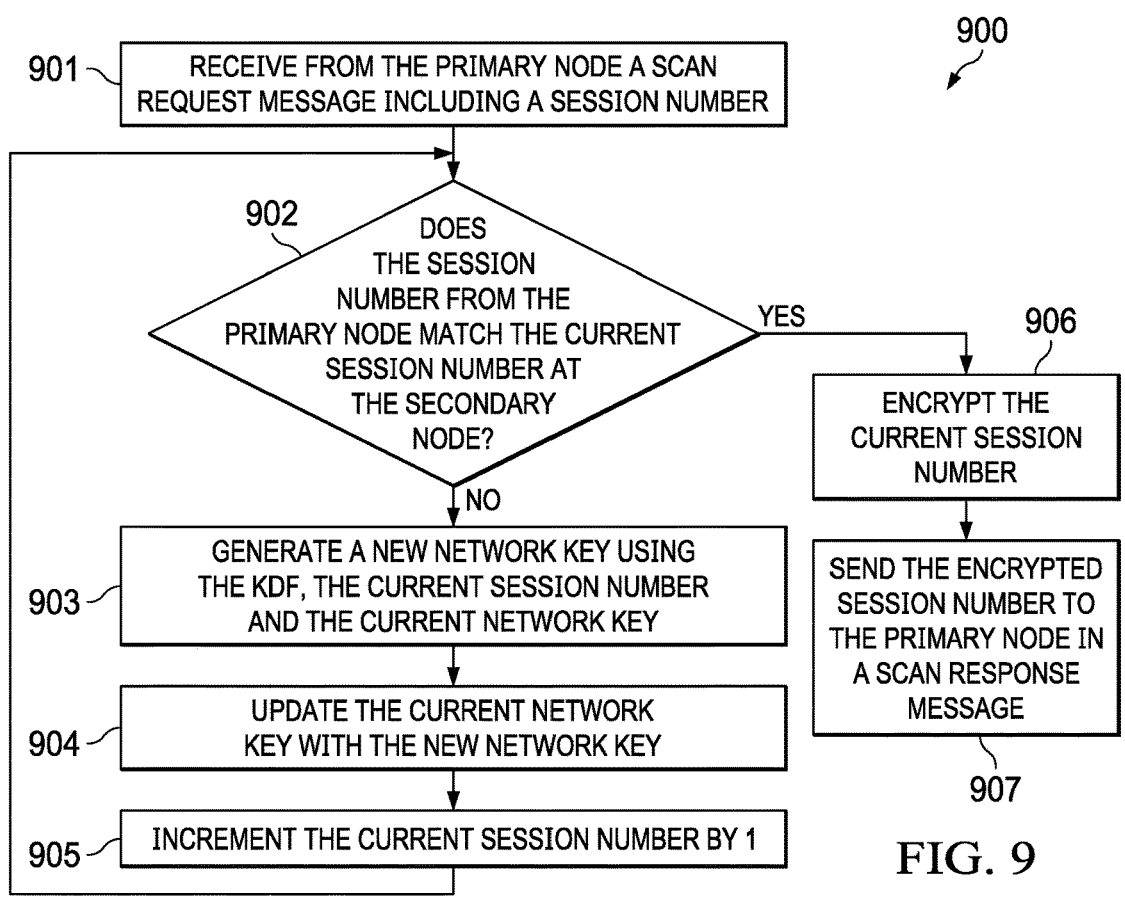
FIG. 9 is a flow diagram of a scanning state process by a secondary node in a wireless network system, in accordance with various examples.

FIG. 9 is a flow diagram of a scanning state process 900 by a secondary node in a wireless network system, in accordance with various examples. The secondary node may implement the steps of the scanning state process 900 during the scanning state 320 to match the session number with the primary node. At step 901, the secondary node may receive from the primary node a scan request message including a session number. The secondary node then verifies, in step 902, whether the received session number matches a current session number at the secondary node. If the session numbers do not match, the secondary node may generate a new network key in step 903, using the KDF, the current session number and a current network key at the secondary node. For example, the secondary node uses the key derivation process 400 to obtain a new network key from current network information. The secondary node may then update the current network key with the new network key in step 904, and increments the session number by one in step 905. The steps 902 to 905 may be repeated until a match with the received session number from the primary node is reached. When a match for the session number is reached, the secondary node may encrypt the current session number using the new network key in step 906. At step 907, the encrypted session number is sent in a scan response message to the primary node.

Figure 10:
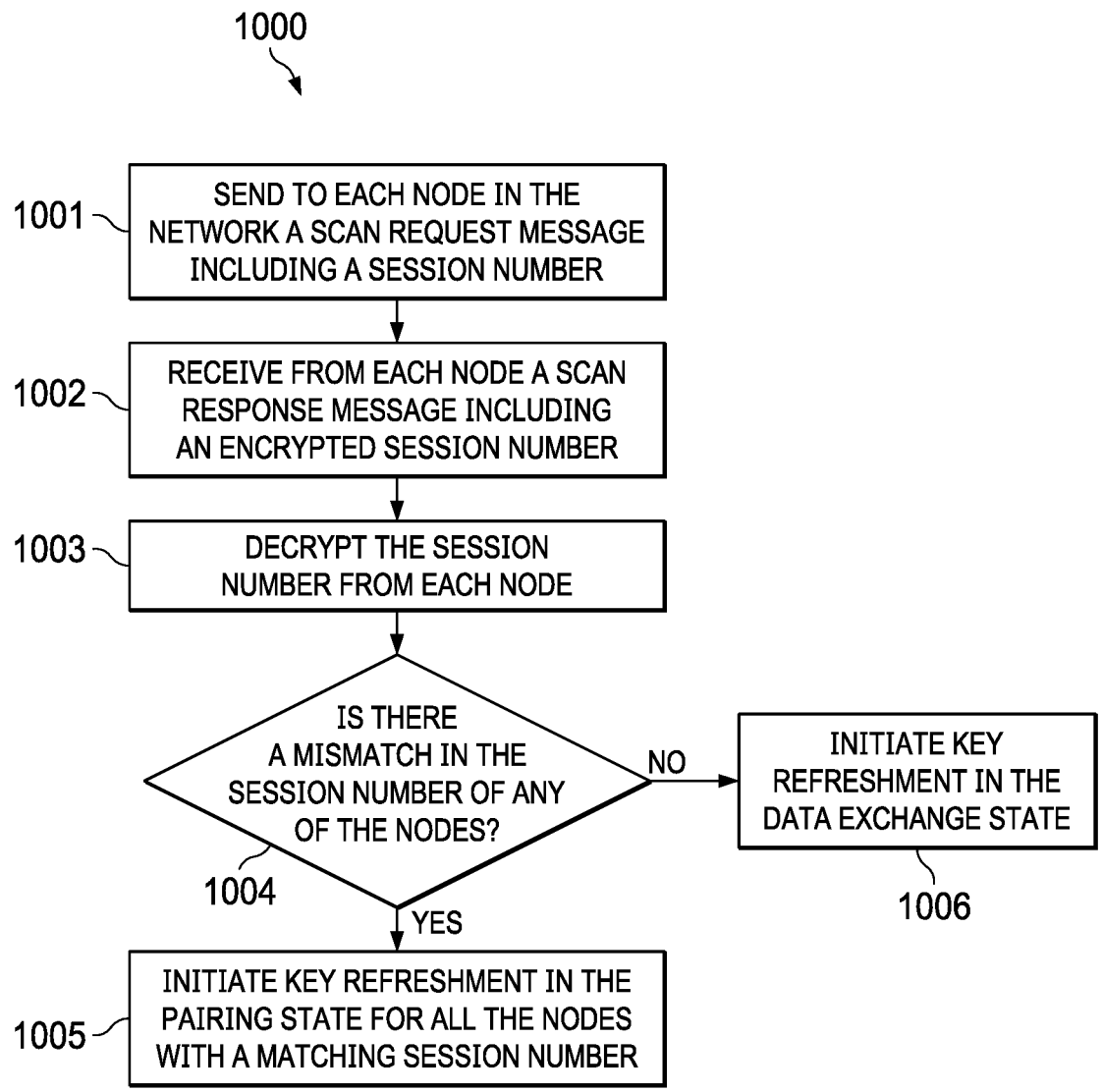
FIG. 10 is a flow diagram of a scanning state process by a primary node in a wireless network system, in accordance with various examples.

FIG. 10 is a flow diagram of a scanning state process 1000 by a primary node in a wireless network system, in accordance with various examples. The primary node may implement the steps of the scanning state process 1000 during the scanning state 320 to determine whether the nodes have maintained a secure connection to the network and initiate key refreshment accordingly. Specifically, the primary node determines whether a secondary node has maintained its secure connection based on matching the session number with the secondary node. At step 1001, the primary node may send each secondary node in the network a scan request message which includes the session number at the primary node. The primary node may then receive in step 1003 a scan response message from each secondary node. The scan response message includes an encrypted session number from the corresponding secondary node. At step 1003, the primary node decrypts, using the network key, the encrypted session number from each secondary node.

The primary node may then verify in step 1004 whether there is any mismatch in the session number from any of the secondary nodes. As described above, a mismatch in the session number between the primary node and the secondary node indicates that the secondary has no longer a secure connection with the network. If a mismatch is detected, the primary node initiates in step 1005 a key refreshment for all the nodes with a matching session number. The key refreshment process is then started in the paring state, for example the paring state 330. However, if all the secondary nodes have sent a matching session number to the primary node and no mismatch is detected by the primary node, then all the nodes are considered to have maintained their secure connection. In this case, the primary node initiates in step 1006 a key refreshment for all the connected nodes during the data exchange state without the need to enter a paring state.

Figure 11:
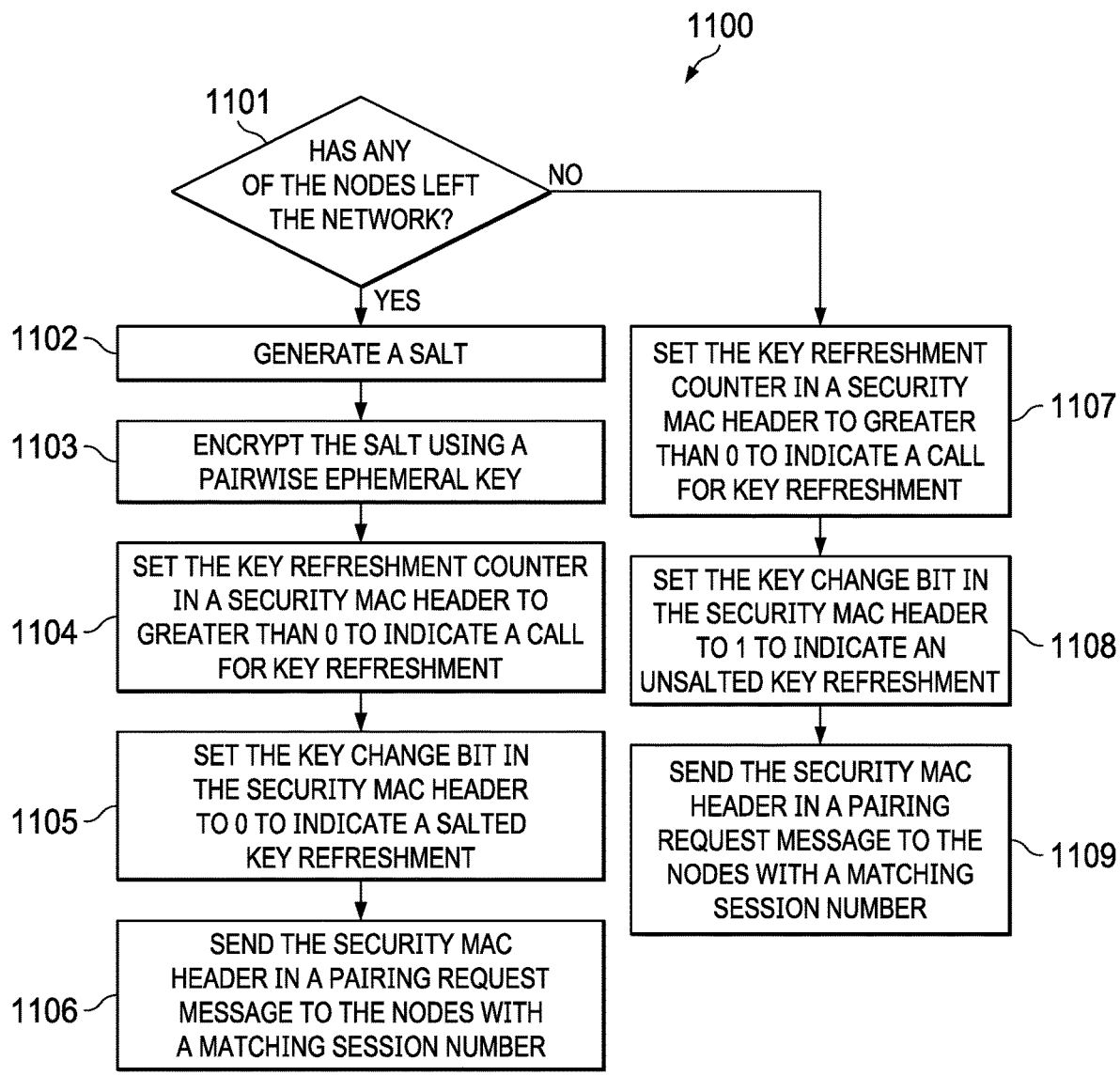
FIG. 11 is a flow diagram of a paring state process by a primary node in a wireless network system, in accordance with various examples.

FIG. 11 is a flow diagram of a paring state process 1100 by a primary node in a wireless network system, in accordance with various examples. The primary node may implement the steps of the pairing state process 1100 after the scanning state process 1000 and during the paring state 330 to manage the key refreshment process for the secondary nodes. First, the primary node may verify in step 1101 whether any of the nodes has left the network. If this is the case, the primary node generates a salt in step 1102. The salt is needed to provides additional input necessary for key refreshment and not available to nodes that had left the network.

At step 1103, the salt is encrypted using a pairwise ephemeral key unique to each of the connected secondary nodes. Each unique pairwise ephemeral key may have been previously shared by the primary node with each corresponding node. At step 1104, the primary node sets a key refreshment counter in a security MAC header to a value greater than zero to indicate a call to the connected nodes for key refreshment. The value may be an integer value that serves as a frame countdown to the nodes before starting key refreshment. At step 1105, the primary node also sets a key change bit in the security MAC header to zero to indicate a key refreshment using the salt, referred to as a salted key refreshment. At step 1106, the security MAC header is sent in a pairing request message to the secondary nodes with a matching session number. For example, the primary node may configure and send the second MAC header value 620 to all the connected nodes having a matching session number.

Alternatively, in the case where none of the connected nodes has left the network, the salt is not needed. In this case, the primary node also sets, in step 1107, the key refreshment counter in the security MAC header to greater than zero to indicate the call for key refreshment. However, in step 1108, the key change bit in the security MAC header is set to one to indicate a key refreshment without a salt, referred to as unsalted key refreshment. At step 1109, the security MAC header is sent in the pairing request message to the nodes having a matching session number.

Figure 12:
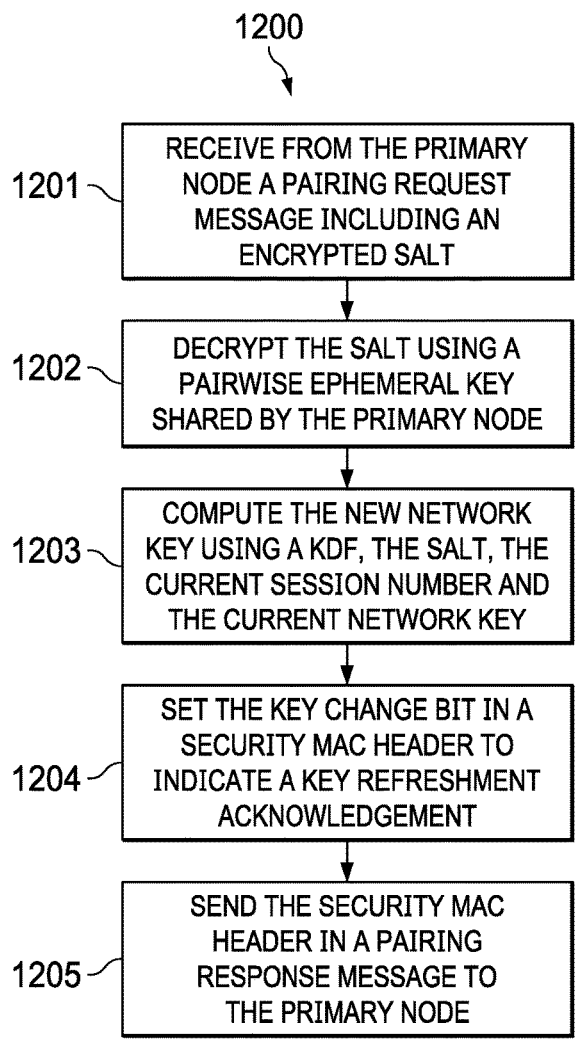
FIG. 12 is a flow diagram of a paring state process by a secondary node with a matching session number in a wireless network system, in accordance with various examples.

FIG. 12 is a flow diagram of a paring state process 1200 by a secondary node with a matching session number to the primary node, in accordance with various examples. The secondary node may implement the steps of the paring state process 1200 after the paring state process 1100 and during the paring state 330 to perform salted key refreshment at the secondary node. Specifically, the paring state process 1200 is implemented by the secondary node after receiving a call for salted key refreshment from the primary node, when one or more nodes have left the network. At step 1201, the secondary node receives from the primary node the pairing request message including an encrypted salt. The secondary node may then decrypt the salt in step 1202 using the pairwise ephemeral key shared by the primary node.

At step 1203, the secondary node computes a new network key using a KDF and using the salt, the current network key and the current session number as input to the KDF. For example, step 1203 may be performed using the key derivation process 500. When key derivation using the salt is completed, the secondary node may set in step 1204 a key change bit, for example to one, in a security MAC header to indicate a key refreshment acknowledgement. The security MAC header is then sent in step 1205 in a pairing response message to the primary node.

Figure 13:
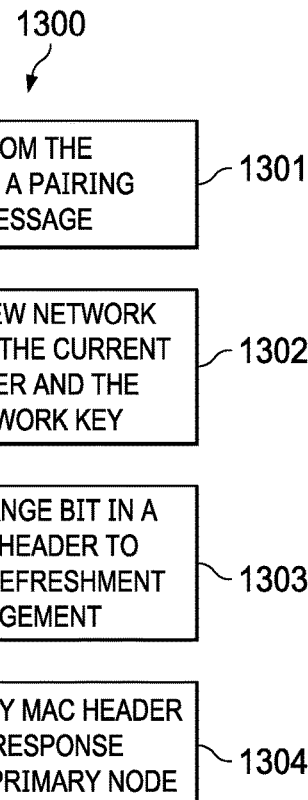
FIG. 13 is a flow diagram of a paring state process by a secondary node using a salt in a wireless network system, in accordance with various examples.

FIG. 13 is a flow diagram of a paring state process 1300 by a secondary node with a matching session number without using a salt, in accordance with various examples. The secondary node may implement the steps of the paring state process 1300 after the paring state process 1100 and during the paring state 330 to perform unsalted key refreshment at the secondary node when none of the nodes have left the network. At step 1301, the secondary node receives the pairing request message from the primary node indicating a call to unsalted key refreshment. At step 1302, the secondary node computes a new network key using a KDF, the current network key and the current session number without a salt.

For example, step 1302 may be performed using the key derivation process 400. When key derivation is completed, the secondary node may set in step 1303 a key change bit, for example to one, in a security MAC header to indicate a key refreshment acknowledgement. At step 1304, the secondary node sends the security MAC header in a pairing response message to the primary node.

FIG. 14 is a flow diagram of a post acknowledgement paring state process 1400 by a primary node in a wireless network system, in accordance with various examples. Specifically, the post acknowledgement paring state process 1400 may be performed in the paring state 330 after the paring state process 1200 or the paring state process 1300. Specifically, the post acknowledgement paring state process 1400 is performed by the primary node to start a new key exchange with the secondary nodes that have a non-matching session number with the pairing node. At step 1401, the primary node receives the acknowledgement of key refreshment from all the node for which the session number has been matched. The primary node then updates in step 1402 the network key and the session number, which may start a new session, and encrypts in step 1403 the new network key and the session number using the pairwise ephemeral key unique to each node. At step 1404, the primary node may reset in a security MAC header the key refreshment counter, for example to zero, and set the key change bit, for example to one, to indicate a new key exchange. The security MAC header and the encrypted network key and session number are then sent in a pairing request message to the nodes for which the session number has not been matched. For example, the primary node may configure and send the third MAC header value 630 to all the nodes having a non-matching session number.

FIG. 15 is a flow diagram of a paring state process 1500 by a secondary node with a non-matching session number in a wireless network system, in accordance with various examples. The secondary node may implement the steps of the paring state process 1500 after the post acknowledgement paring state process 1400 to complete the new key exchange with the primary node. At step 1501, the secondary node receives the pairing request message including the encrypted network key and session number. The secondary node may then decrypt the encrypted message data in step 1502 using a pairwise ephemeral key previously shared with the primary node. At step 1503, the new network key and the current session number at the secondary is updated using the decrypted message data. The secondary node may then set in step 1504 a key change bit, for example to one, in a security MAC header to indicate a key exchange acknowledgement, and send in step 1505 the security MAC header in a pairing response message to the primary node.

Figure 16:
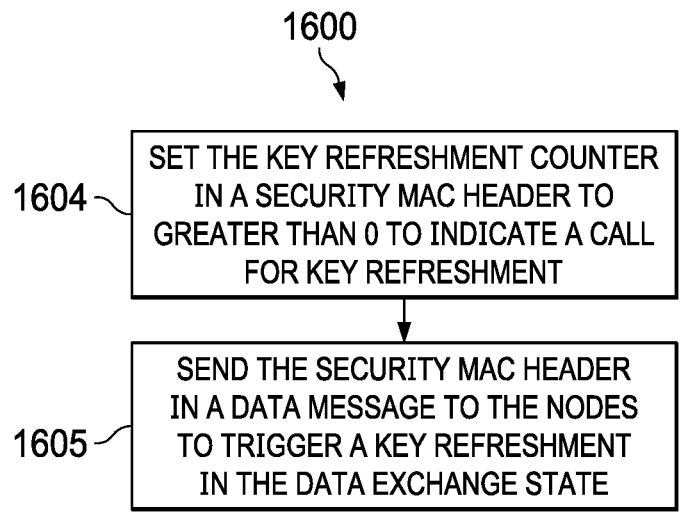
FIG. 16 is a flow diagram of a data exchange state process by a primary node in a wireless network system, in accordance with various examples.

FIG. 16 is a flow diagram of a data exchange state process 1600 by a primary node in a wireless network system, in accordance with various examples. The primary node may implement the steps of the data exchange state process 1600 after the scanning state process 1000, and during the data exchange state 340 to perform key refreshment. Specifically, the data exchange state process 1600 is implemented when all the secondary nodes in the network return a matching session number in the scanning state 320. In this case, all the nodes are considered to have maintained their secure connection and key refreshment can be carried in the data exchange state without the need to start a new session. Accordingly, at step 1600, the primary node sets a key refreshment counter, in a security MAC header, to a value greater than zero to indicate a call to the secondary nodes for key refreshment. The security MAC header is then sent in step 1605 in a data message to the nodes to trigger the key refreshment in the data exchange state.

Figure 17:
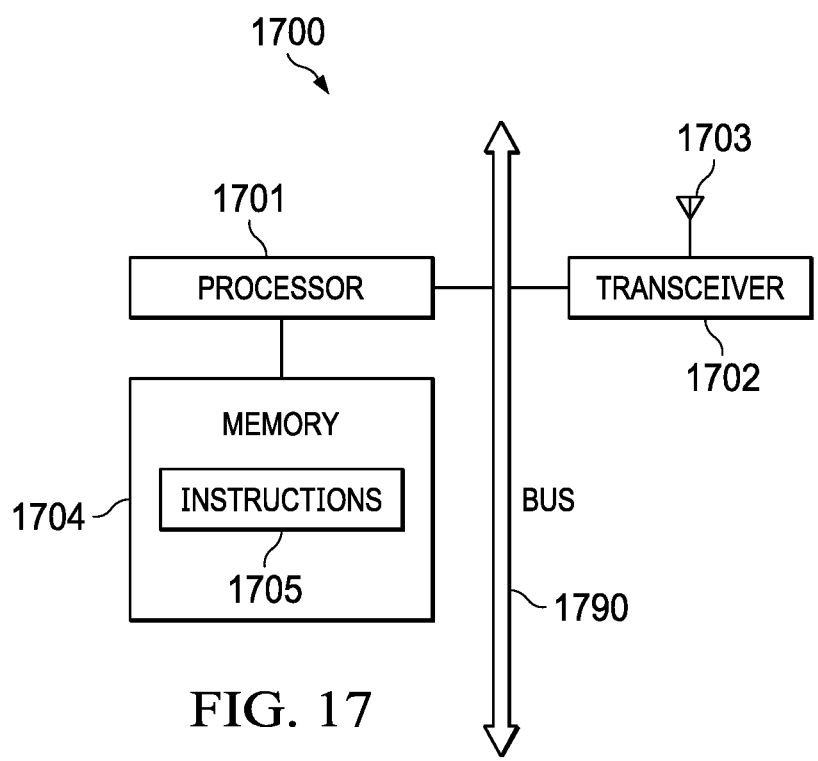
FIG. 17 is a block diagram of a hardware architecture of a network device, in accordance with various examples.

FIG. 17 is a block diagram of a hardware architecture 1700 of a network device, in accordance with various examples. The hardware architecture 1700 comprises hardware components that may be part of a primary node or a secondary node in a wireless network system. For example, the hardware architecture 1700 may correspond to a hardware system in the ECU 130 or the battery modules 110 of a WBMS. As shown in FIG. 17, the hardware architecture 1700 may include one or more processors 1701, one or more transceivers 1702, one or more antennas 1703, and one or more memories 1704. These components may be connected through a bus 1709 or in another manner. In FIG. 17, an example in which the components are connected through a bus 1709 is used.

The antenna 1703 may be configured to convert electromagnetic energy into an electromagnetic wave in free space, or convert an electromagnetic wave in free space into electromagnetic energy in a transmission line. The transceiver 1702 may be configured to transmit a signal that is output by the processor 1701, or may be configured to receive a wireless communications signal received by the antenna 1703. In this example, the transceiver 1702 may be considered as a wireless transceiver.

In addition to the transceiver 1702 shown in FIG. 17, the hardware architecture 1700 may further include another communications component, for example, a Global Positioning System (GPS) module, a Bluetooth module, or a Wi-Fi module. In addition to the wireless communications signal described above, the hardware architecture 1700 may further support another wireless communications signal, for example, a satellite signal or a short wave signal. In addition to wireless communication, the hardware architecture 1700 may be further provided with a wired network interface, for example, a local area network (LAN) interface to support wired communication.

In accordance with various examples, the hardware architecture 1700 may further include an input/output module, for example, an audio input/output module, a key input module, a display, and the like. The input/output module may be configured to implement interaction between the hardware architecture 1700 and a user/an external environment, and may include the audio input/output module, the key input module, the display, and the like. The input/output module may further include a camera, a touchscreen, a sensor, and the like. The input/output modules may communicate with the processor 1701 through a user interface.

The memory 1704 may be coupled to the processor 1701 through the bus 1790 or an input/output port, or the memory 1704 may be integrated with the processor 1701. The memory 1704 is configured to store various software programs and/or a plurality of groups of instructions, including instructions 1705. Specifically, the memory 1704 may include a high-speed random access memory, and may further include a nonvolatile memory, for example, one or more disk storage devices, a flash memory, or another nonvolatile solid-state storage device. The memory 1704 may store an operating system, for example, an embedded operating system such as ANDROID, IOS, WINDOWS, or LINUX. The memory 1704 may further store a network communications program. The network communications program may be used for communication with one or more attached devices, one or more user equipments, or one or more network devices. The memory 1704 may further store a user interface program. The user interface program may display content of an application through a graphical operation interface, and receive a control operation performed by a user on the application by using an input control such as a menu, a dialog box, and a key. The memory 1704 may be configured to store the instructions 1705 for implementing the various methods and processes provided in accordance with the various examples above of this application.

The processor 1701 may be configured to read and execute computer-readable instructions. Specifically, the processor 1701 may be configured to invoke and execute instructions stored in the memory 1704, including the instructions 1705. The processor 1701 may support one or more of global system for wireless communications. When the processor 1701 sends any message or data, the processor 1701 drives or controls the transceiver 1702 to perform sending. The processor 1701 also drives or controls the transceiver 1702 to perform receiving, when the processor 1701 receives any message or data. Therefore, the processor 1701 may be considered as a control center for performing sending or receiving, and the transceiver 1702 is a specific executor for performing sending and receiving operations.

It should be noted that the hardware architecture 1700 shown in FIG. 17 is a possible implementation in various examples of this application. During actual application, the hardware architecture 1700 may further include more or fewer components. This is not limited herein.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A method comprising:
   receiving, from each of a plurality of secondary nodes communicably coupled to a primary node, a current session number;
   comparing the current session numbers to a session number at the primary node to identify a mismatch;
   generating a salt responsive to identifying the mismatch, the salt different from the current session number, the session number, and a key refreshment counter; and
   sending the salt to each of the plurality of secondary nodes having a current session number matching the session number at the primary node.

2. The method of claim 1, further comprising encrypting the salt using a pairwise ephemeral key before sending the salt,
   wherein the pairwise ephemeral key is unique for each of the plurality of secondary nodes communicably coupled to the primary node.

3. The method of claim 1, further comprising initiating key refreshment in a pairing state for each of the plurality of secondary nodes having a current session number matching the session number at the primary node,
   wherein the salt is sent in a pairing request message that indicates a call for a key refreshment.

4. The method of claim 1, further comprising:
   detecting whether any of the plurality of secondary nodes has ended communication with the primary node; and
   generating the salt when at least one of the secondary nodes has ended its communication with the primary node.

5. The method of claim 3, further comprising:
   Setting the key refreshment counter in a security header to indicate the call for the key refreshment;
   setting a key change bit in the security header to indicate the key refreshment using the salt; and
   sending the security header in the pairing request message to each of the plurality of secondary nodes having a current session number matching the session number at the primary node.

6. The method of claim 3, further comprising:
   setting the key refreshment counter in a security header to indicate the call for the key refreshment;
   setting a key change bit in the security header to indicate the key refreshment without using a salt when each of the plurality of secondary nodes has maintained its communicable coupling to the primary node; and sending the security header in the pairing request message to each of the plurality of secondary nodes having a current session number matching the session number at the primary node.

7. The method of claim 1, further comprising:

receiving an acknowledgment for performing key refreshment from each of the plurality of secondary nodes having a current session number matching the session number at the primary node;

updating a network key and the session number at the primary node;

encrypting the network key and the session number at the primary node using a pairwise ephemeral key;

resetting the key refreshment counter and setting a key change bit in a security header to indicate a new key exchange; and sending the security header in a pairing request message to each of the plurality of secondary nodes having a mismatch in its current session number with the primary node.

8. The method of claim 1, further comprising initiating key refreshment in a data exchange state when each current session number at each of the plurality of secondary nodes communicably coupled to the primary node matches the session number at the primary node.

9. The method of claim 8, further comprising:

setting the key refreshment counter in a security header to indicate a call for the key refreshment; and sending the security header in a data message to each of the plurality of secondary nodes communicably coupled to the primary node.

10. The method of claim 1, further comprising:

sending, to each of the plurality of secondary nodes communicably coupled to the primary node, a scan request message comprising the session number at the primary node;

receiving, from each of the plurality of secondary nodes, a scan response message comprising an encrypted session number; and decrypting the encrypted session number using a network key to obtain the current session number at each of the plurality of secondary nodes.

11. A method comprising:

sending to a primary node a current session number at a secondary node communicably coupled to the primary node;

receiving from the primary node a salt in response to sending the current session number, the salt different from the current session number; and generating a new network key using a key derivation function by at least concatenating the salt with the current session number at the secondary node.

12. The method of claim 11, wherein the current session number at the secondary node matches a session number at the primary node.

13. The method of claim 11, further comprising decrypting the salt using a pairwise ephemeral key, wherein the salt received from the primary node is encrypted.

14. The method of claim 13, further comprising receiving the pairwise ephemeral key from the primary node, wherein the pairwise ephemeral key is unique to the secondary node.

15. The method of claim 11, further comprising:

setting a key change bit in a security header to indicate key refreshment acknowledgement; and sending the security header to the primary node in a pairing response message.

16. The method of claim 11, further comprising:

receiving from the primary node a scan request message comprising a session number at the primary node;

comparing the session number to a current session number at the secondary node; and repeating until the session number at the primary node matches the current session number at the secondary node:

generating the new network key using the key derivation function with a current network key and the current session number at the secondary node; and incrementing the current session number by one.

17. The method of claim 16, further comprising:

encrypting the current session number that matches the session number at the primary node; and sending the encrypted current session number to the primary node in a scan response message.

18. An apparatus comprising:

a plurality of secondary nodes each comprising a secondary processor configured to generate a new network key using a key derivation function by at least concatenating a salt with a current session number, the salt different from the current session number; and a primary node configured to connect to the plurality of secondary nodes using a wireless connection and comprising a primary processor, the primary processor configured to generate and send the salt to at least one secondary node from the plurality of secondary nodes responsive to a mismatch between a current session number at another node of the plurality of secondary nodes and a session number at the primary node.

19. The apparatus of claim 18, wherein the primary processor is configured to encrypt the salt using a different pairwise ephemeral key for each of the plurality of secondary nodes, and wherein the secondary processor for each of the plurality of secondary nodes is configured to decrypt the salt using a corresponding pairwise ephemeral key shared with the primary node.

20. The apparatus of claim 18, wherein the apparatus is a wireless management battery system, wherein the primary node is an electronic control unit, and wherein the plurality of secondary nodes are battery modules configured to communicate with the electronic control unit using wireless communications.

21. The apparatus of claim 18, wherein the apparatus is a component of an electric vehicle.

* * * * *